Figure 1:
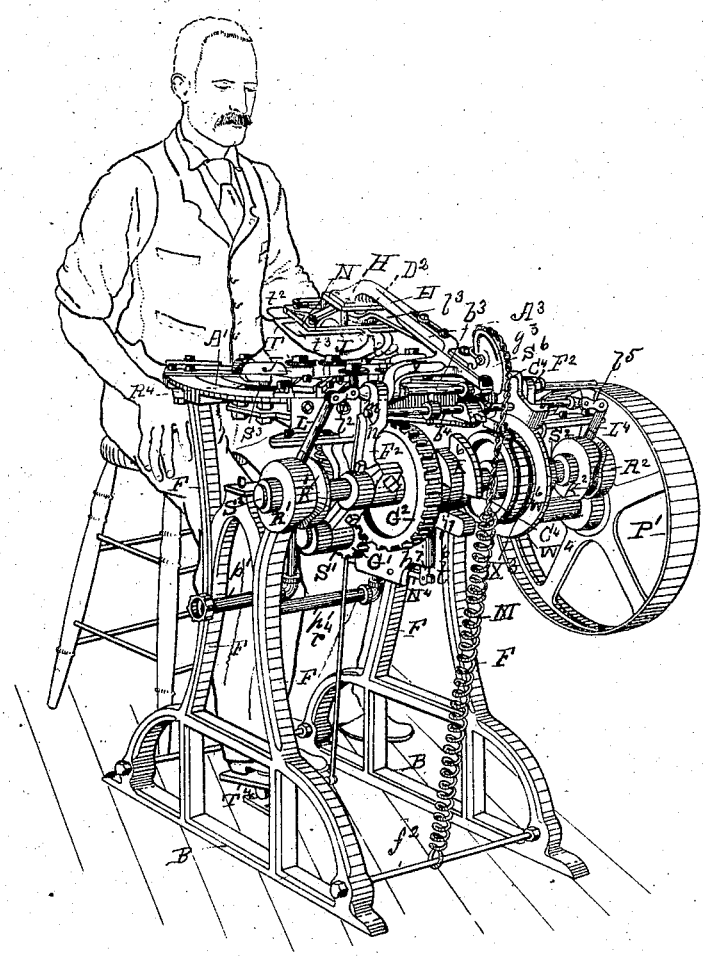

G. J. DORMANDY.
MACHINE FOR INFOLDING THE EDGES OF BLANKS FOR CUFFS OR LIKE ARTICLES.
APPLICATION FILED JUNE 15, 1897.

924,151.

Patented June 8, 1909.
9 SHEETS—SHEET 1.

G. J. DORMANDY.
MACHINE FOR INFOLDING THE EDGES OF BLANKS FOR CUFFS OR LIKE ARTICLES.
APPLICATION FILED JUNE 15, 1897.

924,151.

Patented June 8, 1909.
9 SHEETS—SHEET 3.

WITNESSES
William A. Swett
Alexander S. Brintnall

INVENTOR
Harry J. Dormandy
by W E Hagan atty

G. J. DORMANDY.
MACHINE FOR INFOLDING THE EDGES OF BLANKS FOR CUFFS OR LIKE ARTICLES.
APPLICATION FILED JUNE 15, 1897.

924,151.

Patented June 8, 1909.
9 SHEETS—SHEET 6.

G. J. DORMANDY.
MACHINE FOR INFOLDING THE EDGES OF BLANKS FOR CUFFS OR LIKE ARTICLES.
APPLICATION FILED JUNE 15, 1897.

924,151.

Patented June 8, 1909.
9 SHEETS—SHEET 7.

WITNESSES

INVENTOR

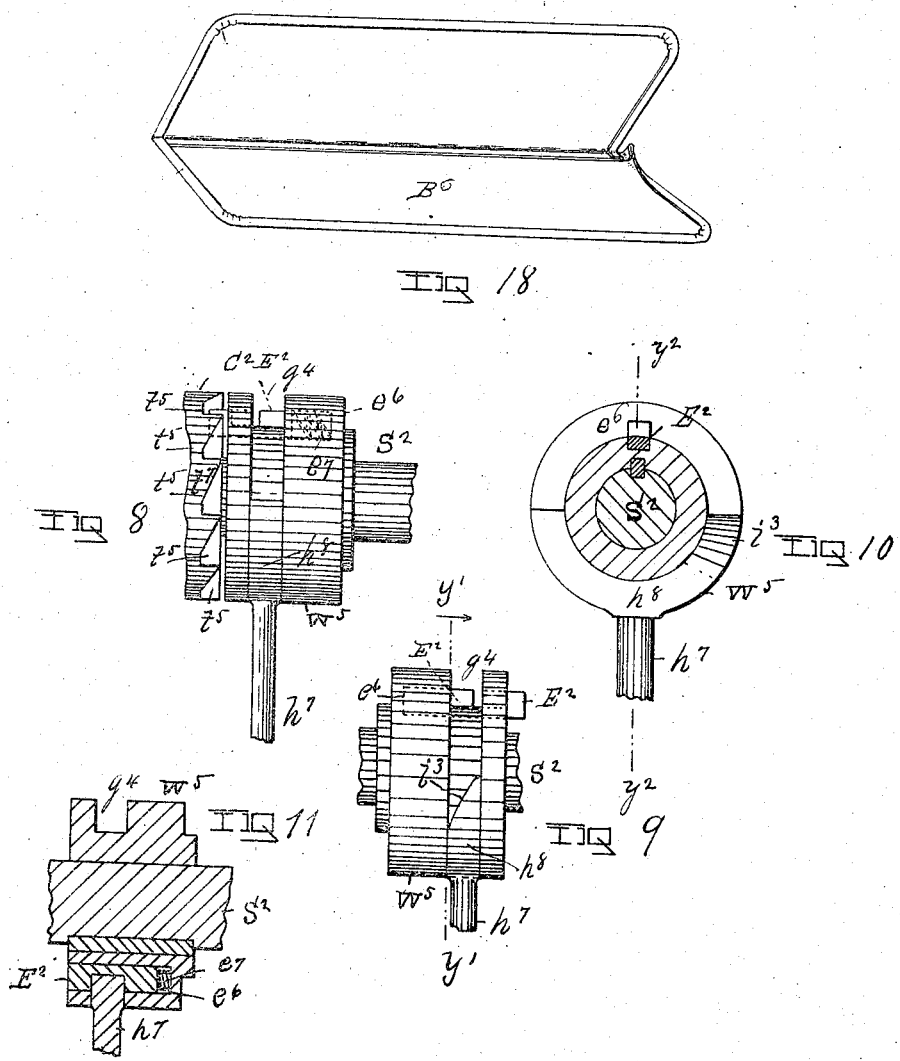

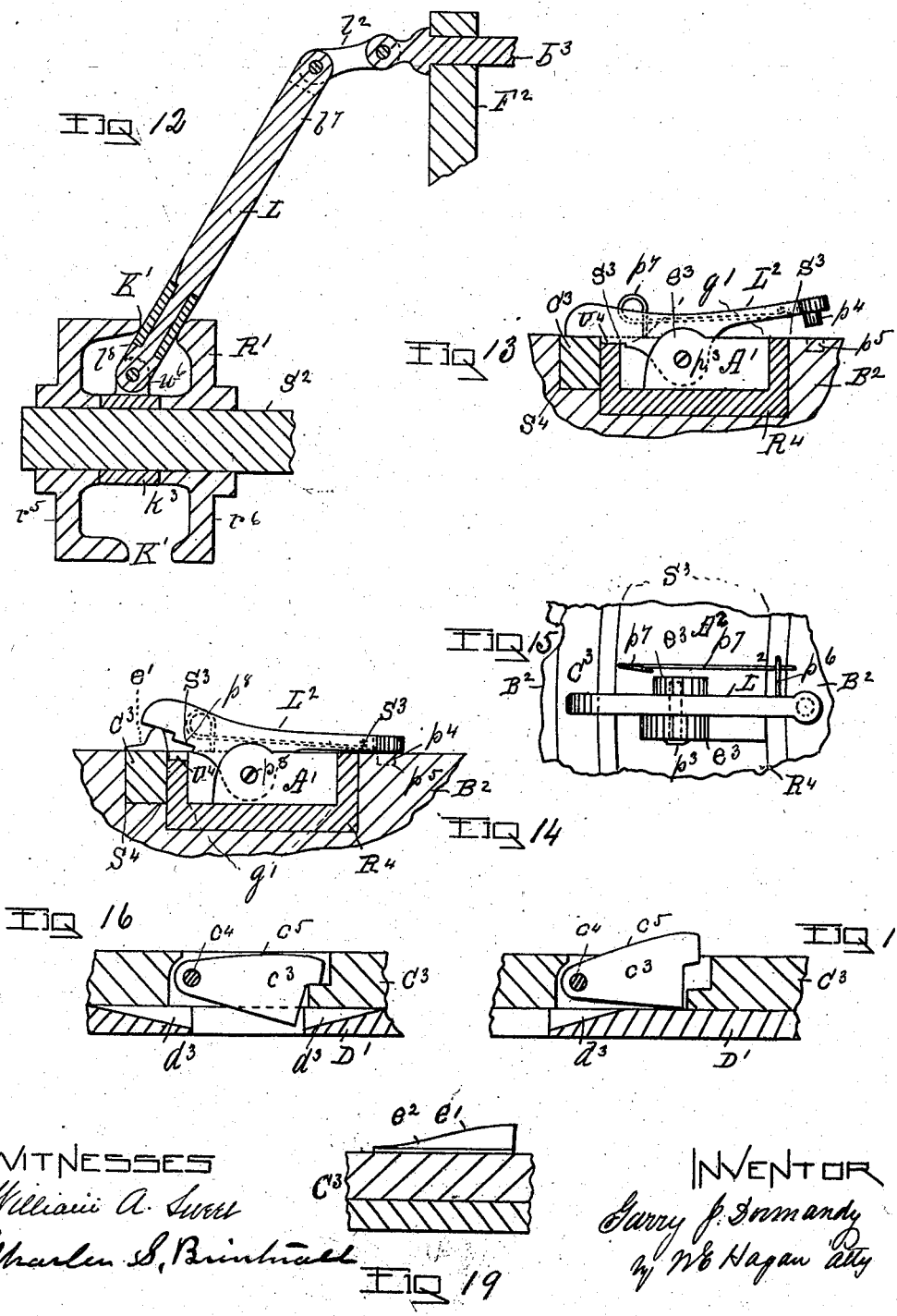

UNITED STATES PATENT OFFICE.

GARRY J. DORMANDY, OF LANSINGBURG, NEW YORK, ASSIGNOR TO UNITED SHIRT & COLLAR COMPANY, OF TROY, NEW YORK.

MACHINE FOR INFOLDING THE EDGES OF BLANKS FOR CUFFS OR LIKE ARTICLES.

No. 924,151.　　　Specification of Letters Patent.　　　Patented June 8, 1909.

Application filed June 15, 1897. Serial No. 640,817.

*To all whom it may concern:*

Be it known that I, GARRY J. DORMANDY, of the village of Lansingburg, county of Rensselaer, State of New York, have invented certain new and useful Improvements in Machines for Infolding the Edges of Blanks for Cuffs or Like Articles, of which the following is a specification.

My invention relates to machines for infolding the edges of cuff or collar blanks or analogous articles, and more particularly to that species of infolding machine comprising in combination a bed or support for supporting fabric blanks, a member or templet having substantially the outline of the finished article and adapted to define the folds to be formed in the blank, and movable infolders having actuating mechanism for causing them to move inwardly to carry the edges of the fabric blanks over the edges of the templet, and outwardly.

The various features of improvement described and claimed in the following specification are shown as applied to an infolding machine which may be driven by power as distinguished from hand operation, and the particular machine shown and described is one in which the templet is composed of a plurality of relatively movable defining plates and in which the infolders are connected with pressing mechanism by which the folds of the blanks can be pressed and creased between the infolders and bed after the extraction or withdrawal of the plates of the templet from such folds. The said features enabling the machine to be run by power constitute an important part of my invention, although many features may be employed with or without the power actuation.

It will be understood that when a blank for a cuff or other article has been infolded at its edges so as to conform to the shape of the templet, said blank together with a similar one or a mate thereto produced in an analogous manner, will be stitched together around the edges to form a completed cuff or other article.

One feature contained in the hereinafter described machine is that of producing the different folds of a single blank alternately or successively in the peculiar manner described, so that the folds last formed will overlap those first formed, thus producing what is known as a lock corner; and the particular mechanism shown is such that one blank may be folded in one manner and a succeeding blank with the edges produced in a reverse order, by which arrangement two blanks produced upon the same machine may be interlocked with each other and anchored prior to the stitching operation.

The above mentioned and many other features including those which relate to the capability of being operated by power, will be hereinafter described and claimed.

I will first describe one particular embodiment of my invention, namely that shown in the drawings hereof, and will thereafter set forth in the claims the novel features thereof.

Accompanying this specification to form a part of it there are nine plates of drawings containing twenty figures illustrating my invention with the same designation of parts by letter reference used in all of them.

Figure 2:
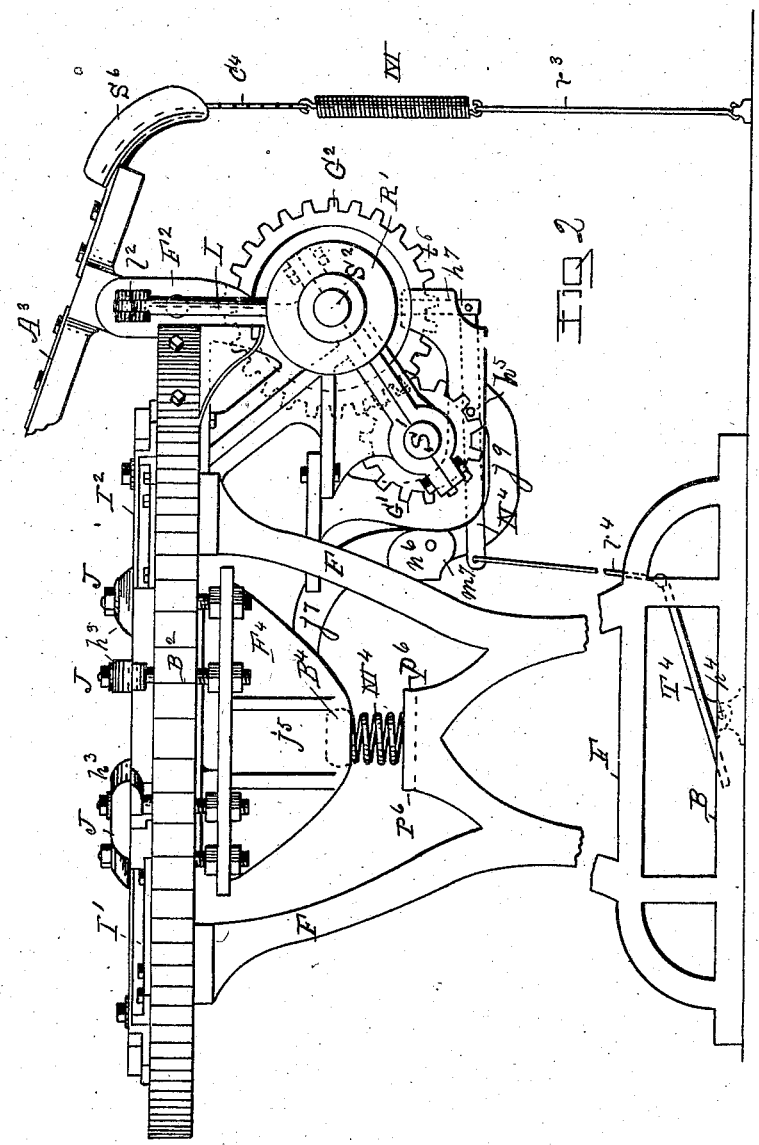
Figure 3:
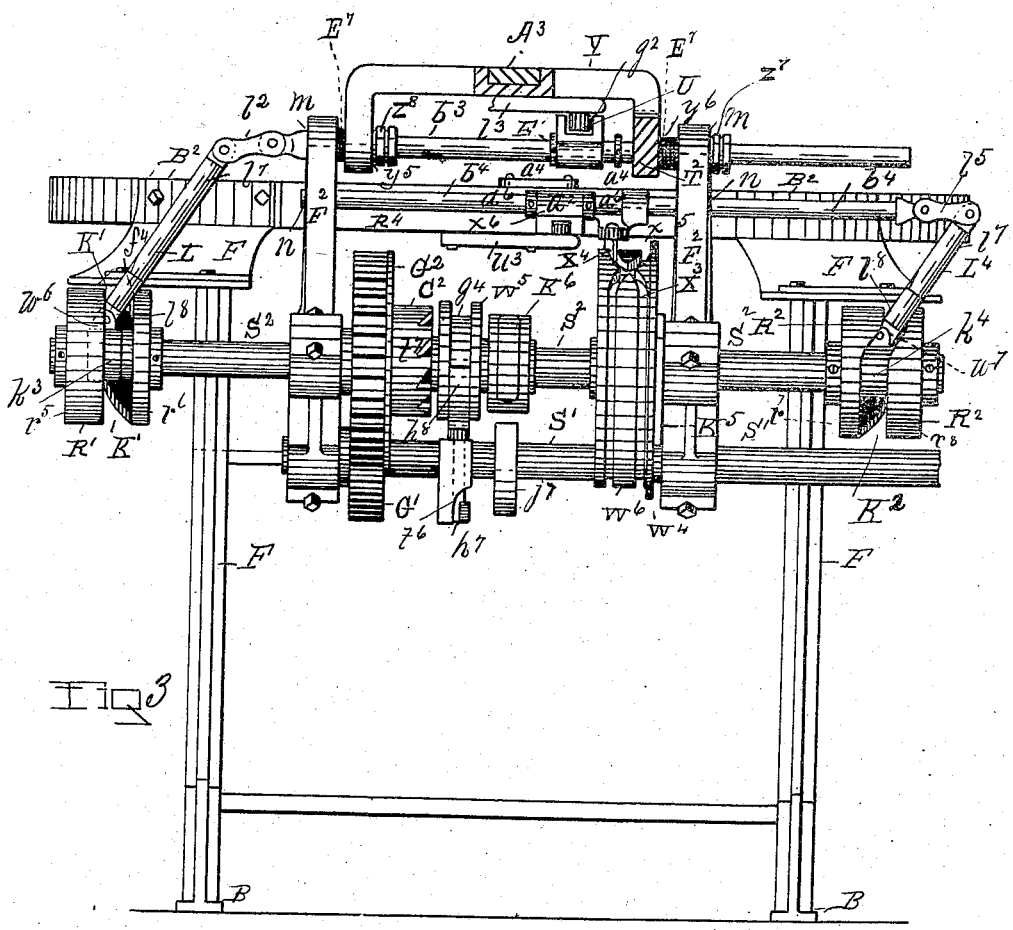
Figure 4:
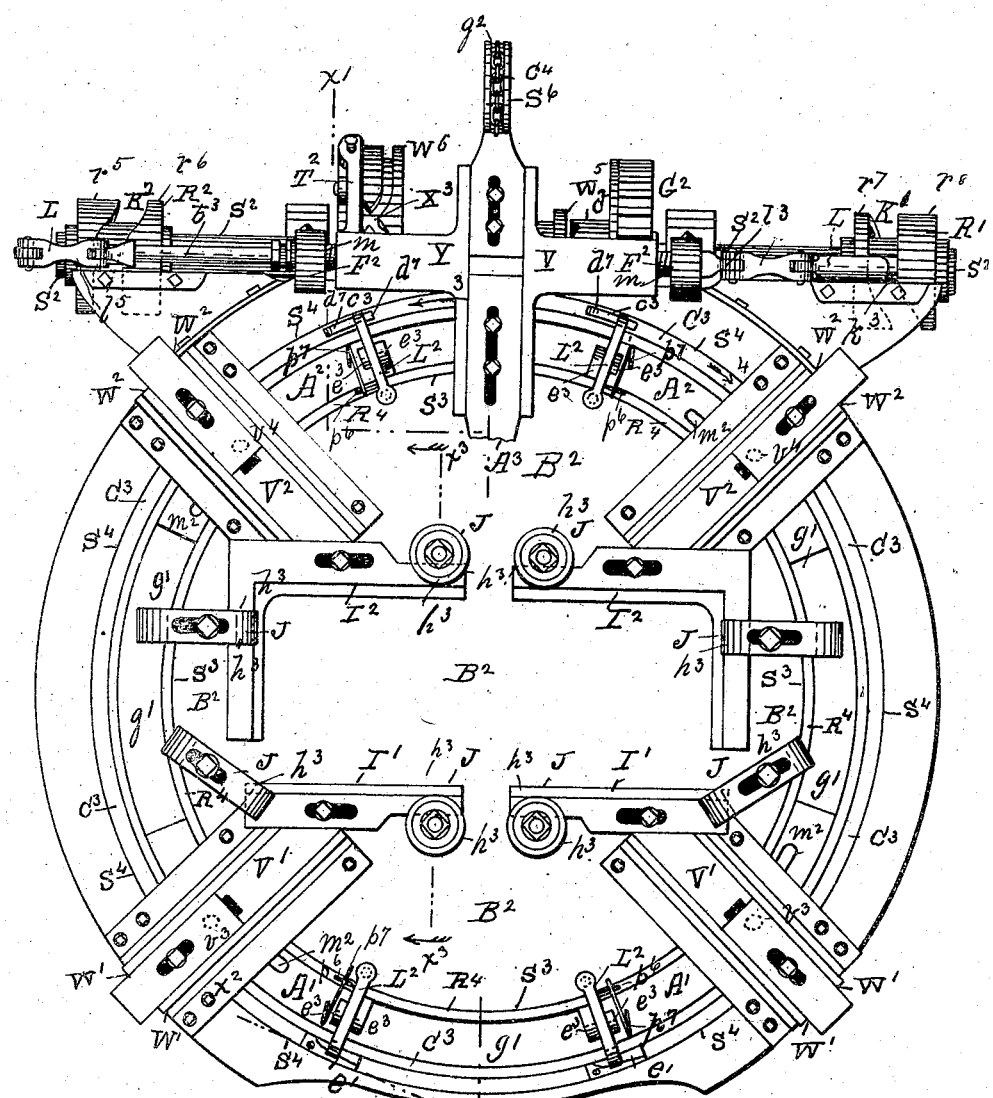
Figure 5:
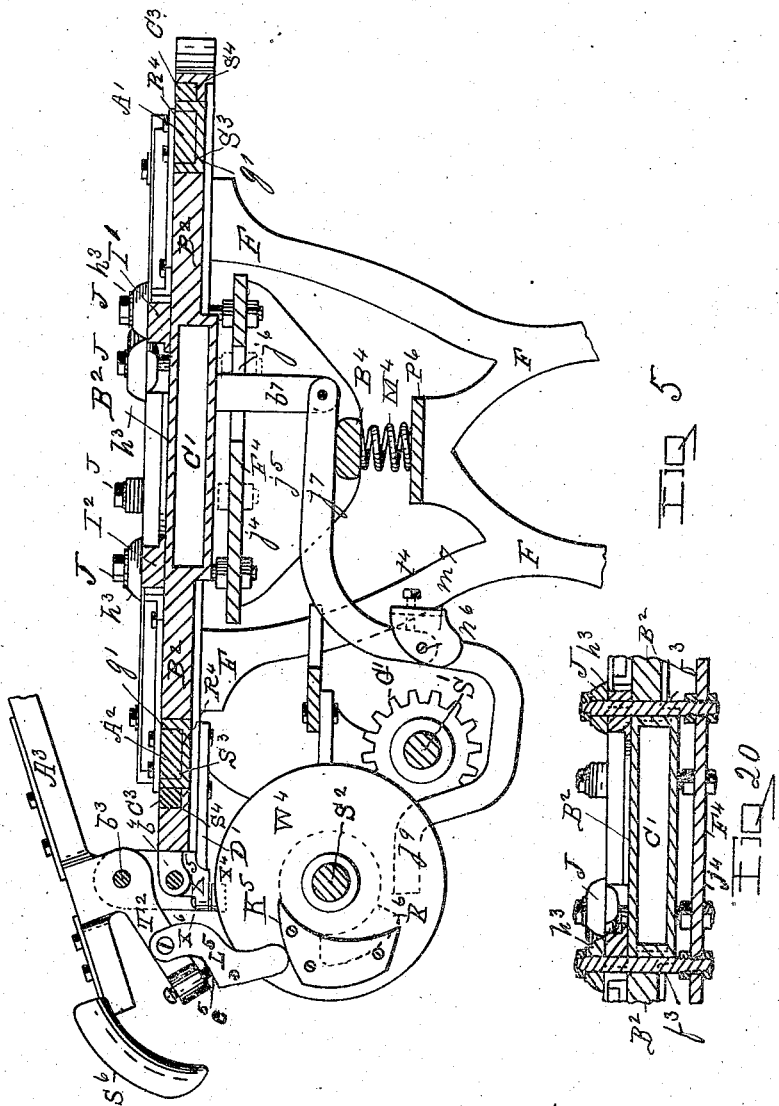
Figure 6:
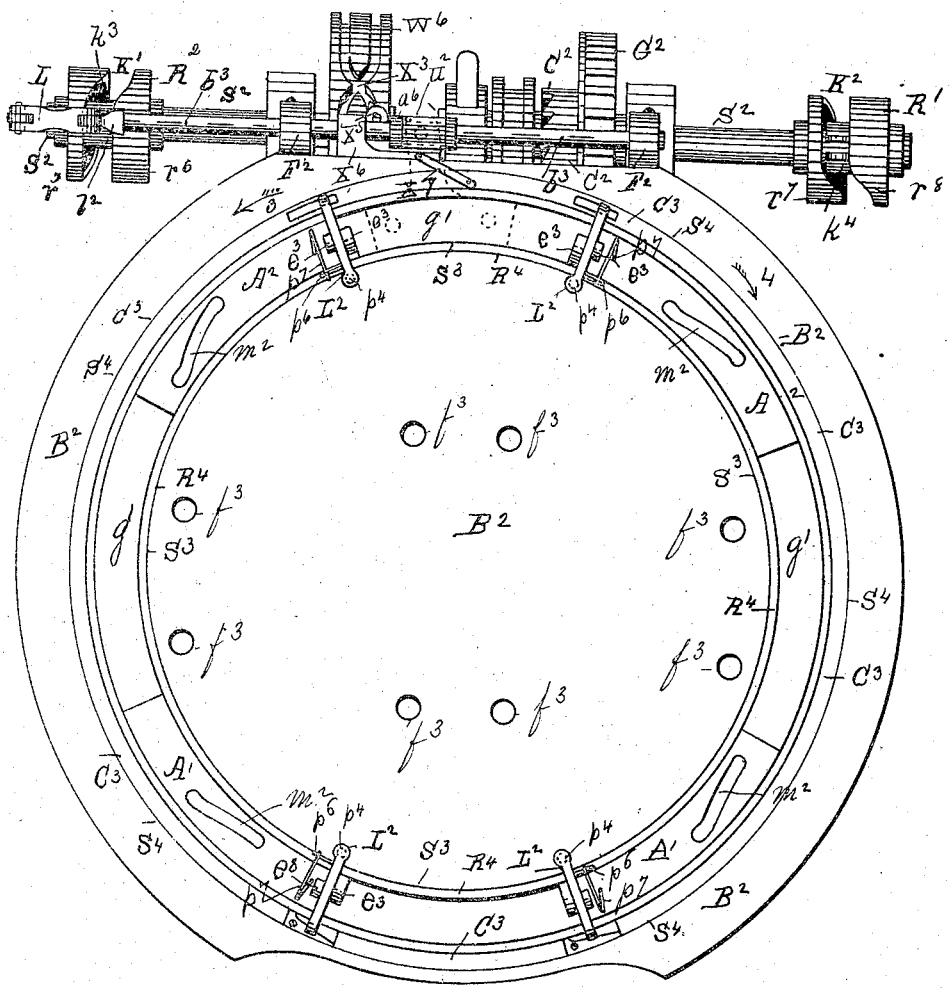
Figure 7:
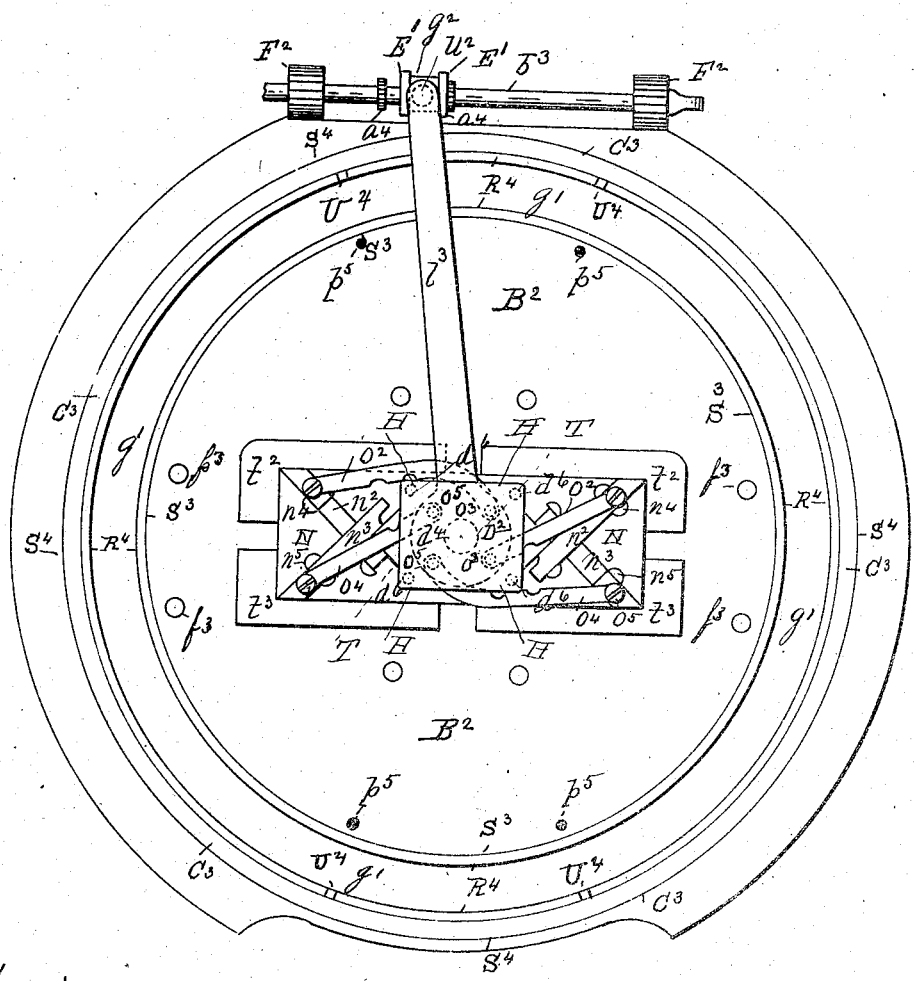

Of these illustrations, Figure 1, is a perspective of a machine containing my invention, showing the position of the operator when applying blanks and when operating the foot-treadle and clutch. Fig. 2, is a side elevation of the machine taken at that side of the latter which is opposite to that at which power is applied, with a part of the templet arm omitted. Fig. 3, is a rear elevation of the machine with the hinged arm on which the templet is mounted shown in cross-section, and with the templet, the treadle, and its connections, together with the driving pulley omitted. Fig. 4, is a top view of the machine with part of the templet-arm shown with the templet omitted. Fig. 5, is a section taken on the line $x^1$, $x^1$ of Fig. 4. Fig. 6, is a top view of the bed of the machine. Fig. 7, is a top view of the bed, with the infolders, the latches and the templet carrying-arm omitted. Fig. 8, is a side elevation of the clutch, the bar which operates it, the slide-pin of the clutch-gland, and a part of the shaft on which the clutch is mounted. Fig. 9, is a side elevation of the same parts that are shown at Fig. 8, taken at the side opposite to the latter, and with the clutch-gland omitted. Fig. 10, is a section taken on the line $y^1$, $y^1$ of Fig. 9, and Fig. 11 is a section taken on the line $y^2$, $y^2$ of Fig. 10, with the wheel containing the clutch-gland shown, as having made half a revolution from the position in which it is shown at Fig. 10. Fig. 12, is a vertical section taken through one of the cam-rollers on the cam-roller shaft (of which there is one of such cam rollers at each end of the shaft made alike) and through the mechanism with which the cam rollers immediately connect. Fig. 13, is a section taken through a part of the bed, the catch-ring, the segment-ring, the annular groove formed in the latter, and the annular slide-way formed in the bed for the catch-ring and the segment-ring, with one of the front segments within the segment ring and shown in end elevation; illustrating also one of the latches in side elevation, as disengaged from the bed. Fig. 14, shows the same parts that are shown at Fig. 13, but with the latch operated to engage with the bed. Fig. 15, is a top view of a part of the bed, one of the segments and one of the latches. Fig. 16, is a section taken through the bed with one of the catch-ring-catches shown in side elevation with the catch as down. Fig. 17, shows the same parts that are shown at Fig. 16, with catch-ring catch raised and in a position to engage with one of the segment-latches. Fig. 18, is a perspective of two collar blanks which have been infolded at their edges, so as to have the end infolds at the rectangular corners of one of the blanks, overlap the side infolds and the other blank having its side infold overlap the end infolds at the rectangular corners by which the infolds thereat may interlock, one within the other for connection when sewed. Fig. 19, is a section taken on the line $x^2$, $x^2$ of Fig. 4, and Fig. 20, is another section taken on the line $x^3$; $x^3$ of Fig. 4.

The several parts of the apparatus thus illustrated are designated by letter reference and the function of the parts is described as follows:

The letters F, designate the frame of the machine, within and upon which the mechanism is mounted, and B, its base.

The letters $B^2$, designate the bed of the machine which is constructed with a chamber $C^1$, in which burning gas or steam is used and supplied by pipes $p^1$ shown at Fig. 1, the heating chamber being illustrated in section at Fig. 5.

The letter $S^1$, designates the driving-shaft which journals in the machine frame, and receives power from a pulley, $P^1$, mounted upon said shaft.

The letter $G^1$, designates a spur-wheel which is keyed to the driving-shaft, and this spur-wheel meshes into a gear-wheel $G^2$, mounted to run loosely upon the shaft $S^2$, when the latter is not operated by the connection which the clutch or gland-pin of the wheel $W^5$ makes with the clutch-wheel $C^2$, formed on the inner side of the gear-wheel $G^2$.

The letters $R^1$ designate a cam-roller mounted on and at one end of the cam-roller shaft $S^2$, and the letter $R^2$ designates another cam-roller which is also mounted upon the shaft $S^2$, at that end of the latter which is opposite to that upon which is mounted the cam-roller $R^1$. This cam-roller $R^1$, has formed in its perimeter the encircling cam-groove $K^1$, and this roller is composed of the two parts $r^5$ and $r^6$, both of which are secured to the cam-roller shafts, $S^2$, at one of its ends, with the cam-groove $K^1$, formed between said roller-parts as shown at Figs. 1, 3, 4 and 6.

The letters $k^3$, designate a sleeve which is arranged upon the cam-roller shaft $S^2$, between the roller-parts $r^5$ and $r^6$, in which sleeve the cam-roller shaft turns.

The letter L, designates a lever which at its lower end is pivoted to the sleeve $k^3$, at $w^6$, and it is therefrom projected outwardly through the cam-groove $K^1$, to connect pivotally by means of the short link $l^2$, with the slide-bar $b^3$. This slide-bar $b^3$, is provided with a slide-way in each of the sleeves $E^7$, which latter at each of their outer ends journal in one of the frame-parts $F^2$, and at their inner ends they each make a threaded connection with one of the arms of the yoke Y. By this connection, as the shaft $S^2$ is rotated, the lever L, as pivoted to the sleeve $k^3$, engages alternatingly with the opposite sides of the cam-groove $K^1$, and through its connection with the bar $b^3$, by means of the link $l^2$, it actuates said bar to move reciprocatingly in the sleeve $E^7$ at $m$, and by the short arm fulcrum connection $f^4$, which this lever L makes with the sides of the cam-groove $K^1$, the measure of its outer end movement where operating the bar $b^3$, is made greater than its short arm movement.

The cam-roller $R^2$ is composed of the two-parts $r^7$ and $r^8$, between which there is formed the cam-groove $K^2$, arranged to encircle the roller, with said roller-parts connected to the shaft $S^2$, at that end of the latter which is opposite to that at which is located the cam-roller $R^1$. The letter $k^4$, designates a sleeve arranged upon the cam-roller shaft between the roller parts $r^7$ and $r^8$, with said shaft adapted to turn in said sleeve. The letter $L^4$, designates a lever which at its lower end $w^7$, pivotally connects with said sleeve and therefrom is projected outwardly to pass between the edges of the cam-groove $K^2$, to pivotally connect by means of a link $l^5$, with the bar $b^4$, having the slide-ways $n$, $n$, in the frame-parts $F^2$, $F^2$. As thus constructed when the shaft $S^2$ is rotated its revolving cam-roller $R^2$, by the connection which the lever $L^4$, makes with the sleeve $k^4$, and the bar $b^4$, will actuate the latter to move reciprocatingly in the slide-ways $n$, $n$, with the outer end $l^7$, of the lever $L^4$, having a greater measure of movement than its short-arm $l^8$. This slide-bar $b^4$, pivotally connects with the segment-ring $R^4$ by means of a bar or plate $u^2$, by which as said bar is reciprocated in its slide-ways the segment-ring is also reciprocated in the slide-way annularly formed in the bed B², and as will be more fully described hereinafter.

The bed of the machine as indicated at B², contains the annular slide-way S³, before named, and also the annular slide-way S⁴, formed in the bed outside of the slide-way S³, and the letter C³ designates a catch-ring adapted to be reciprocated in the slide-way S⁴, by means of a connection made with a switch-cam arranged in the perimeter of a wheel mounted upon the cam-roller shaft S², as will be more fully described hereinafter.

The letters A¹, A¹, designate two segments arranged at the front of the machine within the groove $g^1$, made in the segment-ring R⁴, and the letters A², A², designate two segments arranged in the groove $g^1$, of the segment-ring R⁴, at the rear of the machine. These segments A¹, A¹, operate together when latched to the segment-ring to move with the latter, while at the same time the segments A², A², are latched to the bed B², to remain stationary, when in succession the latter segments become unlatched from the bed and latched to the segment-ring to move together with the latter, when the segments A¹, A¹, become unlatched from the segment-ring and latched to the bed to remain stationary while the segments A², A² are moving. This alternating latching and unlatching of the two sets of segments to the bed and the segment ring R⁴, is accomplished by the following mechanism: The letters $m^2$ designate a slot of which there is one formed in each of the segments and each of which slots is eccentric to the arc of the circle in which the segments move. Each of these segments is provided with a latch L², which is journaled between two ears $e^3$, $e^3$, which latter are upcast from the top of each of the segments; the hinging or journaled connection of the latches between the ears being made by the hinging-pin $p^3$, as shown at Figs. 13, 14 and 15. These latches, of which there is one for each segment, are made alike, and each of them on its inner end and under-side is provided with a downwardly projected pin $p^4$; arranged to enter a sink $p^5$, made in the machine-bed B², when the segment is to be latched to the bed to remain stationary, with the segment ring in which the latched segments are placed free to move in the annular groove or slide-way S³. Each of these latches L² is arranged crosswise of the segment to which it connects, and they are each provided with a spring $p^7$, by which the inner ends of each of the latches are forced upwardly away from the bed, with the outer ends running in contact with the inner top edge of the segment-ring R⁴, excepting when the latches are being acted upon by the catch-ring to latch to the bed. The letters U⁴, designate sinks or recesses formed in the top edge of the outer side of the segment-ring R⁴, and the letters $p^8$, designate a notch cut in the inner end and under side of each of the latches, by which each of the latter will be forced to drop into one of the sinks, U⁴, from the action of the spring $p^7$, when the catch-ring catches unlatch the connection made with the bed, and the segment-ring as moving causes the sinks U⁴ to reach a point beneath the latch-notches $p^8$. One of these latches as thus positioned to latch one of the segments to the segment-ring R⁴, is shown at Fig. 13, and as latched to the bed at Fig. 14.

The catch-ring C³ is arranged to be reciprocated in the annular slide-way S⁴, formed in the bed B², outside of the segment ring slide-way, is provided with two catches $c^3$, $c^3$, located at the rear of the apparatus, each of which is pivoted within a vertical slot made in the catch-ring, which slot is designated at $d^7$, with the pivotal connection designated at $c^4$, as shown at Figs. 16 and 17. Each of these catches has an inclined upper surface $c^5$, which when the catch is raised on its pivotal connection will engage with the outer end of the latch upon the moving segment adjacent thereto when the segment has reached the proper measure of its movement, and by this engagement with the inclined top of the catch as moved by the catch-ring with which it is connected, the outer end of the latch is raised and its inner end forced downwardly against the recoil force of the spring $p^7$ so as to have its pin $p^4$ enter the sink $p^5$, which is next adjacent, and thus each of the catches $c^3$ acts to latch at the same time both of the segments A².

The letters D¹, designate a plate arranged upon the underside of the bed B², beneath the catch-ring C³, and this plate D¹ is provided with inclines $d^3$, $d^3$, which as the catch-ring is moving will simultaneously engage with the underside of the catches $c^3$, and so cause them to rise and thus bring their inclined surfaces each in a position to engage with one of the latches L², upon each of the segments A², to latch them both to the bed by the engagement of their pins $p^4$, with the sinks $p^5$ formed in the bed as before described, and thus hold stationary the segments A², A², while the segment-ring R⁴, is moving to operate the segments A¹, A¹.

The letters $e^1$, $e^1$, designate catches or inclines which are rigidly connected to the top of the catch-ring C³, so as to move with the latter, and each of these catches is provided with an inclined upper surface $e^2$. When the segments A¹, A¹, have been operated to move by being latched to the segment-ring to the required extent of their movement, the inclines, $e^2$, are by the action of the catch-ring C³, caused to engage with the outer end of the segment latches connected to the segments A¹, A¹, to latch the latter to the bed as shown at Fig. 14. Thus by means of the catches $e^1$, $e^1$, upon the catch-ring C³, the segments A¹, A¹, are actuated to connect with the bed, so as to remain stationary, while the segment-ring moves; and the segments A², A², are actuated by the catches c³, c³, on the catch-ring as the latter reciprocates in its slide-way S⁴, to become latched and stationary while the segment-ring moves, and each of the latches on each pair of the segments A¹, A¹, and A², A², as the segment-ring moves when the latch-notch of each of the latches comes over the adjacent sink or recess U⁴, it engages with the latter to latch the segments to the segment-ring to move with the latter.

The letters I¹, I¹, designate infolders which are arranged on the machine-bed at its front, and the letters I², I², designate infolders which are arranged on the machine-bed at its rear. Each of these infolders I¹ is provided with a slide-bar V¹, arranged to move in a slide-way W¹, formed on the machine-bed, and each of these infolders I², is provided with a slide-bar V², and a slide-way W², arranged on the machine-bed. Each of these slide-bars V¹ of the infolders I¹, has projected from its under surface a slide-pin v³, which is arranged to enter and have a sliding or cam engagement with the eccentric slot m², formed in each of the segments A¹, A¹, and each of the slide-bars V², of the infolders I², is provided with a slide-pin arranged on its under surface to enter and make a cam or sliding engagement with one of the eccentric slots m², of the segments A².

Each of the infolders I², I², has an L-form on its inner edge, and as operated together they are adapted when moved inwardly to connectedly infold one side and each of the ends of a blank (having where the ends and one side meet rounded corners) with the movement of these infolders inwardly and outwardly made in a direction that is cornerwise to the infolders and diagonal to the form of the blank being infolded. The infolders I¹, I¹, are also operated to move outwardly and inwardly in a diagonal direction so as to have their end edges in alinement with the ends of the infolders I², when moved inwardly, and to thus produce upon the blank side edge on which they operated an infold having rectangular corners. Each of the infolders I², is connected to its slide-bar to have a small measure of vertical movement in its slide-way so that it can be moved downwardly therein by the pressers to engage with and press in the infolds upon the bed. As thus made and arranged to be operated when the infolders I² are actuated first by one revolution of the machine with the infolders I¹ at rest, and the infolders I¹ are then operated by a subsequent revolution of the machine with the infolders I², I² at rest, then the side edge infold produced by the infolders I¹ will at the corners where rectangular overlap the end infolds; and when the order in which these infolders are actuated is reversed, then the infolds produced by the infolders I², I², will at the rectangular corners overlap the side edge infolds produced by the infolders I¹, I¹. With the parts connected as thus described, when the segment-ring R⁴ is reciprocated in its annular slide-way at each reciprocation such of the segments as are latched to the bed will not operate the infolders with which they connect, but the ring will actuate the segments and their infolders which are not latched to the bed but are latched to the segment-ring; and by the arrangement of the catches upon the catch-ring C³, the infolders I¹, I¹, may be first operated to then become latched and then succeeded by the operation of the infolders I², I². By this means blanks thus having their infolds made to oppositely overlap at their rectangular corners may be arranged to interlock thereat, with the parts appearing as shown at Fig. 18, so that when stitched the blanks may be anchored one within the other at the rectangular corners.

The letters T, designate the templet which may be of any well-known form though I prefer one having plates on its under surface which when expanded will have upon their outer edges the form of the blanks to be infolded. The templet herein shown is adapted to operate upon cuff-blanks having upon one of its edges two rectangular corners, and upon the other side two rounded corners with parallel side edges between the corners. This templet is shown at Fig. 7, and is adapted to be used with the infolders I¹, I¹, and I², I², shown, and of course corresponds in contour therewith.

The letters t², t², designate plates arranged upon the under side of the templet stock N, and the letters t³, t³, designate two other plates also arranged upon the under side of the stock, and at that side of the latter which is opposite to that on which the plates t², t², are placed. The plates indicated at t³, have rounded corners, and the plates designated at t³, have rectangular corners. Each of these plates t² connects with the under side of a slide-bar n², and each of the plates t³ connects with the underside of a slide-bar n³. Each of the slide-bars n² is arranged to be moved outwardly and inwardly in a slide-way n⁴ opening out from the side of the stock on an angle; and each of the slide-bars n³ is arranged to be moved outwardly and inwardly in a slide-way n⁵ opening out from the side of the stock on an angle and at the side of the latter where the slide-bars n³ are located.

The letter D², designates a disk or wheel (indicated by a dotted line at Fig. 7) which is centrally pivoted at d⁴, to the stock N, between the latter and the plate H, which latter is connected to the stock by studs d⁶, and the letters Q², Q², designate links, each of which at one of its ends O³ is pivoted to the top of the disk D², near its perimeter, and each of which links O², at its other end is pivotally connected to one of the slide-bars n³, operating the plates t², t² to move outwardly and draw inwardly; and the letters O⁴, O⁴, designate two other links each of which at its inner end O⁵, is pivotally connected to said disk D², near its rim with the other end of each of said links O⁴, each pivotally connected to one of the slide-bars n³ operating the templet-plates t³, t³, and by which construction as said disk is reciprocated in rotation the templet plates t², t², and t³, t³, are moved outwardly and drawn inwardly. To operate this disk-wheel D², to be reciprocatingly rotated by power, the following mechanism is used: The letter l³, designates a lever which is horizontally projected rearwardly from one side of the disk D², at its rear end, and this lever is provided with an attached slide-pin U². The letter E¹ designates a sleeve provided with a groove g², and arranged on the bar b³, between the collars a⁴, a⁴, rigidly connected to said bar with the slide-pin U within the groove g², of the sleeve E¹. These collars are secured to the bar b³, at a sufficient distance apart for the bar to slide a short distance through the sleeve before operating the lever l³, and thus time the movement of the latter relatively to that of arm A³, as to have the latter commence to descend with the templet before the lever l³, commences to expand the templet-plates, and to have the said lever operate to draw inwardly the templet-plates before the arm A³, commences to rise and remove the templet from off the table. When the bar b³, is being reciprocated horizontally, the outer end of the lever l³ is operated to move back and forth and thus to operate the disk on its pivotal connection to move outwardly and draw inwardly the templet plates. These collars a⁴, a⁴, are adapted to adjustably connect with the bar b³, by means not shown, there being one of them at each side of the sleeve E', at such distance apart as will give to said sleeve E', slide-pin U², and lever l³, the proper measure of movement required to operate the templet disk-wheel D², and provide for an interval of rest between the expanding and indrawing of the templet-plates at each reciprocation of the bar b³. The letters Z⁷, designate a collar and jam-nut arranged on the bar b³ outside of one of the frame-parts F², and the letter Z⁸, designates another collar and jam-nut arranged on the bar b³, inside of the adjacent yoke-arm.

The letters A³, designate the templet arm by which the templet is operated to descend on to, and to rise from off the bed B². This arm connects with the templet top-plate H, at the top of the latter which is attached to the stock N, above the disk-wheel D², and the lever l³, connecting with the latter. From where the arm A³ connects with the templet top-plate H, it is extended rearwardly and horizontally to rigidly connect with the yoke Y. This yoke Y, at y⁵ and y⁶, journals on the bar b³, so as to oscillate thereon, and the arm A³, where extending beyond the yoke is provided with a segment S⁶, made with a groove q³, in its outer surface, and the letter C⁴, designates a chain connecting with said arm in front of the segment, and from where thus connected this chain is arranged within the groove q³, and extended downwardly to connect with a spring M with the lower end of the latter connected to the cross-bar f², of the frame F, as shown at Fig. 1, or with the chain connecting with the spring M, and the latter at its lower end with the floor of the room in which the machine is placed by means of the rod r³ as shown at Fig. 2.

The letter T², designates an arm which is rigidly connected to the yoke Y, at one end of the latter, and this arm is provided with a depending leg L⁵, which adjustably connects with the arm T², by means of a set-screw e⁵, as shown at Fig. 5.

The letters K⁵ designate a cam which is rigidly attached to the wheel w⁴ on the cam-roller shaft S², so as to move with the latter when actuated, and when the latter is rotating and the cam K⁵ comes in contact with the depending leg L⁵, it will raise the latter and thus force downwardly at the front the yoke Y, connected arm A³, lever l³, and the templet with the latter resting on the bed B². When the engagement of the cam K⁵ and the leg L⁵ ceases, then the spring M becomes active to raise the arm A³ and templet from off the bed.

The letters J designate the pressers, the function of which is to bear down upon the infolders I¹, I¹, I², I², and operate them to descend upon the infolds made in the blanks between the infolders and the heated bed. These pressers J, consist of vertically placed bars which at their lower ends are attached to a presser frame beneath the bed, and they are arranged to pass loosely through vertical openings made in the bed, and at their upper ends each of these pressers is provided with a head h³, which overhangs the infolders.

The letters f³ designate the openings formed in the bed for the passage of the presser-bars J, and their vertical movement therein; and the letters F⁴ designate the frame with which these bars J, at their lower ends, connect. This frame consists of a horizontal top-plate j⁴, from the upper surface of which the bars J, are upwardly projected. This plate j⁴, at each of its ends, connects to the top of a V-form end-plate j⁵, of which there is one at each end of the frame; and the letters j⁶, designate a passage-way made in the said frame top-plate.

The letters B⁴, designate a horizontal bar which at each of its ends connects with one of the frame end-plates j⁵, and the letters M⁴ designate a spiral spring of which there is one at each end of the bar $B^4$, interposed between the latter and the frame cross-plate $P^6$.

The letter $b^7$ designates a bar which at its upper end rigidly connects with the bottom of the bed $B^2$, and therefrom depends to pass through the opening $j^6$, made in the presser top-plate.

The letters $j^7$ designate a curved lever which at its front end pivotally connects with the depending bar $b^7$, and from this connection it passes rearwardly to rest on the bar $B^4$, and therefrom in curved direction to terminate in the horizontal end-part $j^8$. The letter $K^6$ designates a cam arranged upon the shaft $S^2$, with the rear end of this lever $j^7$, so positioned that it will be depressed at its rear end by its engagement with said cam $K^6$, and thus bear downwardly on the bar $B^4$, against the force of the springs $M^4$, and thus pull downwardly the presser-frame $F^4$, and cause the heads $h^3$ of the pressers J, where overhanging the infolders, to press downwardly upon the latter and thus fix the infold; and when this engagement of the lever $j^7$, and the cam $K^6$, ceases, the springs $M^4$ become active to raise the presser frame and the pressers J from off the infolders. This lever $j^7$ is jointed at $n^6$ and made to tongue into a block $m^7$, by which the rear end of the lever may be raised or depressed to regulate the measure of engagement which the end of the lever $j^7$ makes with the cam $K^6$, with the parts thus adjusted held in place by the set-screw $t^4$.

The letters $T^4$ designate a foot-treadle, which has a fulcrum pivot at $h^4$, and at its rear end, it pivotally connects with the lower end of the rod $r^4$, and the latter, at its upper end, pivotally connects with another lever $N^4$, which is centrally pivoted at $h^5$ to the machine frame, and at its rear end this lever $N^4$, pivotally connects with the lower end of the clutch-shoe-bar $h^7$. This latter is arranged to move in a vertical slide-way $t^6$, arranged on the machine frame at its rear, and at its upper end to connect with the crescent-form shoe $h^8$, having a cam or incline $i^3$, upon one of its upwardly projected ends. As thus constructed, when the foot-treadle is pressed downwardly at the front, its connections with the shoe-bar $h^7$, will cause the latter and its connected shoe to descend from out of the groove $g^4$, made in the face of the wheel $W^5$, which latter is keyed to the cam-roller shaft $S^2$, and when the treadle is not pressed down, the bar $h^7$ and shoe $h^8$ will enter the groove $g^4$.

The letter $E^2$ designates the gland-pin which is arranged in a recess or slide-way $e^6$, formed in the wheel $W^5$, in a line parallel to the shaft on which the wheel turns, and this pin is provided with a spring at one of its ends within the recess as shown at $e^7$, against the recoil force of which this pin is moved inwardly in its recess. This pin has an offset end, which enters the groove $g^4$ with its other end passing through the side of the wheel $W^5$, so as to enter one of the spaces between the teeth $t^5$ of the clutch-wheel $C^2$, and this pin is held in engagement with the serrated side surface $t^7$ of the clutch-wheel $C^2$ by means of its spring $e^7$, which latter forces that end of the gland-pin which is opposite to the one whereat is located the spring $e^7$, and to pass through the slideway in the wheel $W^5$ to enter one of the recesses between two of the teeth of the clutch-wheel, as shown at Figs. 8, 9, 10 and 11. This clutch-wheel $C^2$ is formed on the inner side face of the gear-wheel $G^2$, running loosely upon the cam-roller shaft $S^2$, which meshes into the pinion $G^1$, on the driving-shaft $S^1$. As thus constructed and adapted to connect, when the gland-pin is in engagement with the clutch-wheel, the cam-roller shaft and its connections are operated, and when the gland-pin is forced out of its engagement with the clutch-wheel, the cam-roller and its connections are at rest; and each time the foot-treadle is depressed and the pressure upon it released, the machine makes one complete revolution of the cam-roller and its connections, and then the cam-roller and its connections come to a rest to be again started by the depression of the foot-treadle, after which the mechanism is again started to complete the infolding of the blank, when the latter is removed from the bed and an unfolded one placed thereon.

The letter $X^3$ designates a switch-cam having two cam grooves connecting by a switch, and formed in the perimetral face of the wheel $W^6$, mounted upon the cam-roller shaft, so as to turn with it, as shown at Fig. 3. The letter $X^4$ designates a traveler or slide-pin arranged to run in said grooves, when the wheel in which they are formed is rotated and in its movement when passing through the switch to pass from one groove to the other. This traveler or slide-pin is projected downwardly from the outer end and under side of an arm $x^5$, extended laterally from a carrier $x^6$, which at its inner end is sleeved on to the sliding-bar $b^4$, so as to move back and forth thereon as actuated by the movement of the traveler or slide-pin in the switch-cam-grooves.

The letter $x^7$ designates a link which at one of its ends is pivoted to the carrier $x^6$, and therefrom is horizontally extended to connect with the top of the catch-ring $C^3$, as shown at Fig. 6, by which connection as the traveler or slide-pin in its movement within the switch-cam groove alternatingly passes by the switch from one of them into the other, the catch-ring is reciprocatingly rotated in its annular slide-way $S^4$, formed in the bed $B^2$.

When the catch-ring $C^3$ is moving in the direction indicated by the arrow 3, of Figs. 4 and 6, the catches $c^3$, $c^3$, each engage with one of the latches L², L², of which there is one of them mounted upon each of the segments A², A², which operate the infolders I², I², to detain them, and at the same time to unlatch from off the catches $e^1$, $e^1$, the latches L², L², of which there is one mounted upon each of the segments A¹, A¹, which operate the infolders I¹, I¹, and when the catch-ring is reversed in direction as indicated by the arrow 4, of Figs. 4 and 6; the operation of the latches and catches is reversed.

The letter $u^2$ designates a sleeve arranged upon the sliding-bar $b^4$, between the two collars $a^6$, $a^6$; and the letter $u^3$, designates a bar which pivotally connects with the underside of the segment-ring R⁴ at one of its ends, and at its other end to the sleeve $u^2$, and by which connection as the bar $b^4$ is actuated to slide back and forth in its slide-ways $n$, $n$, the segment-ring R⁴ is reciprocatingly rotated in its annular slideway S³.

From the foregoing description it will be seen that the shafts S¹ and S², or either of them, may be considered as a single means or a single part for effecting any two or more of the various operations, as those of infolding, pressing, shifting the catch-ring, lowering and raising the templet, and expanding and contracting the plates thereof. The catch-ring C³ is in effect a controller, by the shifting or reciprocating of which, one or more of the cams which actuate the infolders are attached or detached, so that a part of the infolders will be operative, while others are rendered inoperative, so that a part of the infolds of the blanks may be formed in one revolution of the shaft S², and the remaining infolds formed subsequently.

I do not wish to confine myself to mechanism which will complete the infolding in two operations, as it is obvious that in some forms of blanks, there may be required three or more successive operations to obtain the desired result. Nor do I wish to confine myself to a shaft S², which stops after a single rotation, as identical results are obtainable by a greater or less amount of rotation, by suitable changes.

While at one of the periods of rest, and when the shaft S² is stationary, a blank is laid upon the bed in the space between the infolders, and with what is its inner face when made up uppermost. The foot-treadle is then depressed at the front which releases the gland-pin, thus making active its spring to connect the clutch C³, and operate the shaft S², to turn as before described. On the initial movement of the shaft S², the templet arm A³ and the connected templet T, are actuated to descend upon the bed with the templet-plates expanded by the lever $l^3$, and simultaneously with the movement of the templet-arm and templet, the catch-ring C³ is actuated to make the advance movement of its reciprocation to latch the segments A¹, A¹, which latter operate the infolders I¹, I¹, and in immediate sequence the segment-ring R⁴, while making the advance, half of its reciprocation acts upon the segments A², A², latched to the latter to move inwardly the infolders I², I², so as to carry the subtending edges of the blank over the two ends and one side of the expanded templet-plates; after the foregoing has been accomplished the plates of the templet are drawn inwardly and the presses J are actuated to descend upon the infolders to press the infolds between the infolders and the bed, and to then rise when the templet-arm and templet are raised from off the bed and the infolders I², I² are moved outwardly and the shaft S² becomes stationary with the blank upon the bed having an infold formed upon its two ends and one side. To complete the formation of the infolds upon the form of blank thus illustrated, the foot-treadle is again depressed at the front and movement given to the shaft S², and its connections by which the templet-arm and templet with its plates expanded again descends upon the blank, while the catch-ring making its return movement latches the segments A², A², and operates to unlatch the segment A¹, A¹, while the segment-ring R⁴ operates the segments A¹, A¹, to move inwardly the infolders I¹, I¹, to carry the unfolded and bottom subtending edge of the blank over the templet-plates thereat. This having been done, the templet-plates are drawn inwardly with their inward movement succeeded by the descent of the pressers J. Succeeding the movement of the pressers, the infolders I¹, I¹, are moved outwardly, and the templet-arm and templet are again actuated to rise from off the blank, when the latter is removed from the bed. As thus infolded the last infold made, and upon that side of the blank having rectangular corners, will overlap at the latter the end infolds previously produced. To have the end infolds over the side infold at the rectangular corners of the blank, the order in which the infolders act in pairs is reversed.

While I have shown a mechanism constructed and arranged to perform the several functions of operating the templet-arm and templet to descend on to, and rise from off a blank placed upon the bed, with means for expanding and indrawing its bottom plates, and a means for actuating a segment-ring to reciprocatingly rotate in an annular slideway, and to operate segments provided with latches arranged therein; and means also to operate a catch-ring provided with catches whereby in connection with the segment latches as operated by the segment-ring the infolders are actuated to move alternatingly in pairs; also a mechanism for operating pressers to descend upon and rise from off the infolders; if desired, the latches upon the segments, the catch-ring and its catches, together with the means connecting the same with the driving power, may be dispensed with and the other factors retained without departing from my invention.

While I have illustrated and described a templet provided with expanding and indrawing plates, having two rounded and two rectangular corners, and infolders having on their inner edges a form corresponding to that of the templet-plates when expanded, I do not limit my invention of a means for alternatingly latching and unlatching the mechanism operating the infolders to the use of such of the latter and the templet which I have herein shown; inasmuch as the mechanism which I illustrate and describe may be used to operate in substantially differing forms of templets, with the number of the infolders increased or diminished.

To the pressers which I illustrate and describe apart from the means to automatically operate them, I make no claim.

When I use the term "die" in the claims, I refer to the templet heretofore referred to, composed of a plurality of expanding and contracting plates, which plates may be termed "sections".

Wherein the claims I use the term "folding knives", I refer to the parts that have hereinbefore been termed "infolders". So, also, the words "die" and "templet" are used in the same sense, and the plates of the templet are sometimes referred to as "sections". The part $b^3$, which has been hereinbefore referred to as a "slide bar" is in effect an axle, inasmuch as the templet supporting arm $A^3$ turns about the bar or axle $b^3$ as an axis. The templet supporting arm in one or more of the claims I have referred to simply as a "support", and as being pivoted on the bar or axle $b^3$. The enlarged portion at the outer end of the templet supporting arm may be designated as a "cross-head"; and this is the part upon which the templet or die is mounted in order that the templet or die may be carried upwardly and downwardly when the supporting arm $A^3$ is rotated about the axle or bar $b^3$ upon which it is pivoted.

The yoke Y forms a convenient means by which the templet supporting arm $A^3$ may be pivoted upon the bar or axle $b^3$. The device E' hereinbefore called a "sleeve", is arranged on the bar or axle $b^3$ and adapted to be moved longitudinally and for convenience is rigidly connected to the bar or axle $b^3$, whereby the longitudinal movements may be communicated to the device E' through the bar or axle $b^3$, as already explained. This device or sleeve E' may be accurately designated as a shifting device, the purpose of the shifting thereof being, as already explained, to effect the movements of the arm $l^3$ for the purpose of expanding and collapsing the die or templet.

When I use the term "frame" in claims 33, 35 and 36, I refer to the swinging member or templet stock N which forms a part of what has hereinbefore been referred to as a crosshead. In claim 36 the "means coöperating with said templet for receiving and retaining a blank in place for folding" refers to that portion of the bed of the machine which forms a support for the blank.

As further explaining claims 44-55, I would say that like the arm $A^3$, which carries the templet, the arm $l^3$ (Fig. 7) extends rearwardly from the templet toward the axis of swinging. In one aspect there are thus two rearwardly extending arms, the main one fitted at its rear end for swinging and at its front end rigidly connected to the templet body or stock or frame; while the other is movably connected with the templet, having connections for operating the templet plates, and at its rear end has a device or connections for causing it to move to and fro relatively to the arm $A^3$, preferably but not necessarily a to-and-fro oscillation; at any rate so that its forward end will move or operate a templet plate or plates. This is novel with me, irrespective of the number of movable plates or the timing of the operation thereof, or the precise connection or device at either the forward or rearward end of arm $l^3$, or the form of the arm, or the character of the connection at the rear of arm $l^3$ whether or not it is automatic, as shown, or the means of operating the machine whether or not by power as shown, or any other details not set forth as requisites in said claims.

Having thus described my invention, what I claim and desire to secure by Letters Patent is:

1. In a machine for infolding cuff blanks or analogous articles, the combination of a support for the blanks, a templet, infolders for infolding edge portions of the blanks upon said support, a mechanism for pressing the infolds so formed between the said support and infolders, a continuously rotating shaft, means actuated by said shaft for effecting the operations of said infolders, and means actuated by said shaft for effecting the operation of said pressing mechanism automatically at each operation of the infolders and before the latter are moved outwardly.

2. In a machine for infolding cuff blanks or analogous articles, the combination of a support for the blanks to be infolded, a templet having expanding and contracting plates, edge portions of which are adapted to bear directly upon the blanks upon said support, and within edge portions of the blanks, infolders constructed to move inwardly and outwardly whereby edge portions of the blanks may be folded over edge portions of the templet, means whereby the folds of the blanks may be pressed between the support and the infolders after withdrawal of the plates of the templet from the folds and thereby fixed with a sharp fold, and a single part constructed and fitted for effecting the operation both of said infolders, and of said pressing means.

3. In a machine for infolding cuff blanks or analogous articles, the combination of a support for the blanks, a templet having expanding and contracting plates, edge portions of which are adapted to bear directly upon the blanks upon said support, and within edge portions of the blanks, infolders constructed to move inwardly and outwardly whereby edge portions of the blanks may be folded over edge portions of the templet, means whereby the folds of the blanks may be pressed between the support and the infolders after withdrawal of the plates of the templet from the folds, and thereby fixed with a sharp fold, a main operating shaft, means actuated by said shaft for effecting the inward and outward movements of infolders and means operated from said shaft for actuating the said pressing means while infolders are in their inward position.

4. In a machine for infolding cuff blanks or analogous articles, the combination of a support for the blanks, a templet provided with expanding and contracting plates, said templet constructed and fitted to be positioned upon and removed from the blanks upon said support, infolders constructed and fitted to move inwardly and outwardly to infold edge portions of the blanks, over edge portions of said templet, and a single means for effecting the expanding and contracting of the plates of said templet, and for operating said infolders to fold edge portions of the blanks over edge portions of the templet while the latter is in expanded position.

5. In a machine for infolding cuff blanks or analogous articles, the combination of a support for the blanks, a templet provided with expanding and contracting plates, said templet constructed and fitted to be positioned upon and removed from the blanks upon said support, infolders constructed and fitted to move inwardly and outwardly to infold edge portions of the blanks, over edge portions of said templet, a moving part constituting a source of power, means actuated by said moving part for effecting the expanding and contracting of the plates of said templet, means actuated by said moving part for operating said infolders to fold edge portions of the blanks over edge portions of the templet while the latter is in expanded position, and means actuated by said part for effecting the pressing of the folds of the blanks between the infolders and said support before the infolders are moved outwardly, but after the said templet is contracted, whereby the infolds are creased with a sharp fold.

6. In a machine for infolding the edges of blanks for cuffs or analogous articles, the combination of a support for the blanks to be infolded, a templet constructed and fitted to be positioned upon and removed from the blanks upon said support, the said templet provided with expanding and contracting plates and means for expanding and contracting said plates, infolders constructed and fitted to move inwardly and outwardly whereby edge portions of the blanks may be folded over edge portions of the templet, mechanism for pressing the folds of the blanks between the support and infolders, and means for rendering said machine automatic, comprising a moving part constituting a source of power, and mechanisms actuated by said moving part for effecting the following named operations in substantially the order named: positioning the templet upon the blanks with its plates in expanded position; moving infolders inwardly; contracting the templet plates; operating the pressing mechanism; and moving the infolders outwardly and elevating the templet.

7. In a machine for infolding cuff blanks or analogous articles, the combination of a support for the blanks, a templet provided with expanding and contracting plates, said templet constructed and fitted to be positioned upon and removed from the blanks upon said support, infolders constructed to move inwardly and outwardly to infold edge portions of the blanks over edge portions of said templet, and a single means for effecting the positioning and removal of said templet from the blanks, and for expanding the plates thereof, and contracting the plates again after the infolds have been formed on the blanks, and before the said templet is removed from the blanks.

8. In a machine for infolding cuff blanks or analogous articles, the combination of a support for the blanks, infolders constructed to move inwardly and outwardly to infold edge portions of the blanks upon said support, a part fitted to move to and fro, means operated by said part for effecting the inward and outward movements of infolders, a shifting controller, and means intermediate of said controller and of infolders whereby one or more infolders may be rendered inoperative while other infolders are operating, so that a part only of the infolds of the blanks may be formed in a single operation.

9. In a machine for infolding cuff blanks or analogous articles, the combination of a support for the blanks, infolders constructed to move inwardly and outwardly, a part fitted to move to and fro, cams operated by said part for effecting the inward and outward movements of infolders, a reversely moving controller having a plurality of positions, and a mechanism intermediate of said controller and of cams, whereby one or more cams may be rendered inoperative in one position of said controller, and the same cams be rendered operative in other positions of said controller, so that the blanks upon said support may be infolded by successive infolding operations.

10. In a machine for infolding cuff blanks or analogous articles, the combination of a support for the blanks, infolders constructed to move inwardly and outwardly, an approximately annular oscillating portion, cams actuated by said annular portion for effecting the inward and outward movements of infolders, a second annular portion fitted to move from one position to another position, and a mechanism operated by said second annular portion for detaching and attaching cams, whereby in one oscillation of said cam actuating annular portion one or more infolders may be operated, and in a succeeding oscillation thereof other infolders may be operated, so that the blanks may be infolded by successive operations.

11. In a machine for infolding cuff blanks or analogous articles, the combination of a support for the blanks, infolders constructed to move inwardly and outwardly, a part fitted to move to and fro, means operated by said part for effecting the inward and outward movements of infolders, a shifting controller, means intermediate of said controller and of infolders whereby the controller may render one or more infolders inoperative or operative, and means whereby the said controller is shifted automatically upon each operation of the said to and fro part, to render a different infolder or set of infolders operative at a succeeding operation of the said part, so that the blanks upon said support may be infolded by successive infolding operations, and the infolds last formed overlap other infolds.

12. In a machine for infolding cuff blanks or analogous articles, the combination of a support for the blanks, infolders constructed to move inwardly and outwardly, a part fitted to move to and fro, means operatively connecting said part and infolders whereby the said part may effect the inward and outward movements of infolders, one or more of said infolders constructed to be disconnected from said part, means for effecting an automatic change of infolders at each to and fro movement of said part, whereby the blanks may be infolded by successive operations, and means for pressing infolds of the blanks between infolders and said support before such infolders are moved outwardly.

13. In a machine for infolding cuff blanks or analogous articles, the combination of a support for the blanks, a templet constructed to expand and contract and adapted to bear directly upon the blanks upon said support, infolders constructed to move inwardly and outwardly to infold edge portions of the blanks over edge portions of the templet, a part for effecting the movements of infolders, one or more infolders constructed to be disconnected from said part whereby such infolders may remain stationary while other infolders are operating, means whereby one or more infolders are held stationary during one operation, and at a succeeding operation infolders which were held stationary will be actuated, so that the blanks may be infolded by successive operations; and means for pressing the infolds between infolders and said support at each operation of such infolders.

14. In a machine for infolding cuff blanks or analogous articles, the combination of a support for the blanks, a templet having edge portions adapted to bear directly upon the blanks upon said support, infolders constructed to move inwardly and outwardly to infold edge portions of the blanks over edge portions of said templet; means whereby one or more infolders may be latched to said support to hold such infolders stationary, and a part for effecting the inward and outward movements of infolders which are not latched to said support.

15. In a machine for infolding cuff blanks or analogous articles, the combination of a support for the blanks, a segment-ring fitted to said support to oscillate, segments having a sliding connection with said ring, infolders constructed to move inwardly and outwardly, means intermediate of segments and infolders, whereby the said ring may effect the inward and outward movements of infolders, latches normally latching segments to said segment-ring, a reversely moving controller, and means intermediate of said controller and of latches, whereby the said controller may unlatch one or more segments from said segment-ring to hold such segments stationary, while the segment-ring is actuating other segments to operate the infolders connected thereto, and to thereby infold one or more edge portions of the blanks upon said support.

16. In a machine for infolding cuff blanks or analogous articles, the combination of a support for the blanks, said support provided with latch sinks, a segment-ring fitted to said support to oscillate, and provided with latching recesses, segments having a sliding engagement with said segment-ring, a spring latch for each segment, infolders constructed and fitted to move inwardly and outwardly on said support, cams intermediate of segments and of infolders, whereby said segment-ring may effect the inward and outward movements of infolders, a catch-ring provided with catches, and means for oscillating said catch-ring to alternately latch and unlatch one or more segments at each oscillation of the said segment-ring, whereby the infolders may be operated in sets to infold the blanks upon said support by successive infolding operations.

17. In a machine for infolding cuff blanks or analogous articles, the combination of a support for the blanks, infolders constructed to move inwardly and outwardly to infold edge portions of the blanks, a part fitted to move to and fro, for effecting the inward and outward movements of infolders, a mechanism for rendering one or more infolders inoperative, and a part for controlling said mechanism, a shaft constructed to make a given revolution and then stop, means operated by said shaft for actuating said to-and-fro part, and means operated by said shaft for actuating said controller, whereby in successive revolutions of said shaft, different infolders, or sets of infolders may be operated to form infolds on the blanks upon said support, the infolds last formed overlapping other infolds.

18. In a machine for infolding cuff blanks or analogous articles, the combination of a support for the blanks, infolders constructed to move inwardly and outwardly to infold edge portions of the blanks, a presser having portions thereof adapted to extend over infolders when the latter are moved inwardly, a part for actuating said presser to effect a relative vertical movement between infolders and said support, to press the infolds of the blanks between the infolders and support, and a device for adjusting said part to regulate the extent of the said vertical movement.

19. In a machine for infolding cuff blanks or analogous articles, the combination of a support for the blanks, infolders constructed to move inwardly and outwardly, upwardly projected pressers having heads thereon adapted to extend over infolders, a lever operatively connected to said pressers whereby the pressers may be operated to effect a vertical movement of infolders sufficient to press with a sharp fold the infolds of the blanks beneath such infolders, a rotating shaft for actuating the said lever, and means for adjusting said lever so that the extent of vertical movement of said infolders may be regulated.

20. In a machine for infolding cuff blanks or analogous articles, the combination of a support for the blanks, infolders constructed to move inwardly and outwardly, a shaft constructed to make a given rotation and then stop, a part actuated by said shaft for effecting the inward and outward movements of infolders, a presser lever, means for connecting said lever and infolders, whereby the said lever may effect a vertical movement of infolders sufficient to press with a sharp fold the infolds of the blanks beneath such infolders, and a cam actuated by said rotating shaft for operating said presser lever.

21. In a machine for infolding cuff blanks, or analogous articles, the combination of a support for the blanks, a templet for defining the blanks upon said support, a pivoted arm carrying said templet, said arm provided with a segment beyond the pivot thereof, a chain or its equivalent engaging said segment, a spring acting on said chain to hold said templet normally elevated, a rotating cam, and means intermediate of the said cam and said templet arm whereby the said cam may effect the lowering of said templet upon the blanks.

22. In a machine for infolding cuff blanks or analogous articles, the combination of a templet having expanding and contracting plates, a templet arm constructed to be raised and lowered about an axis of rotation, means for effecting the raising and lowering of said arm and the said templet, a reversely moving bar located near the axis of rotation of said templet arm, a lever pivoted to said templet and adapted to be oscillated by the said bar, and means operated by said lever for effecting the expanding and contracting of templet plates.

23. In a machine for infolding cuff blanks or analogous articles, the combination of a continuously rotating shaft $S^1$, a second shaft $S^2$ having a clutch-wheel $C^2$ loosely mounted thereon, said wheel $C^2$ geared to shaft $S^1$, a grooved wheel $W^5$ secured to shaft $S^2$, a spring actuated clutch-pin fitted to wheel $W^5$ to slide therein to engage the clutch-wheel $C^2$, an U-shaped piece $h^8$, adapted to engage the groove of wheel $W^5$, a treadle and mechanism operated by said treadle, for effecting the engagement or disengagement of the piece $h^8$ and wheel $W^5$, substantially for the purpose specified.

24. In a machine for folding collars and the like, a die, a pivotal support therefor for swinging the same up and down, means co-operating with said die for retaining a blank to be folded, folding mechanism for infolding the edges of said blank, said die being composed of a plurality of parts expansible and contractible, and means mounted co-axially of said swinging movement for expanding and contracting said die.

25. In a machine for folding collar blanks or the like the combination with a blank supporting bed and infolding knives, of a sectional die movable toward and away from the blank supporting bed, and an actuating cam for moving said die sections toward and away from each other to contract and expand the die, said actuating cam being mounted outside and independent of the die, whereby the movement of the die sections is automatically controlled independently of the movement of the die toward and away from the bed.

26. In a folding machine, the combination with a supporting bed and folding knives, of a sectional die, an actuating cam having an operative surface for expanding the die and another operative surface for collapsing the die, and intermediate connections between said cam and the sections of the die, whereby the relative movements of the die sections are controlled.

27. In a machine for infolding collars and the like, an expansible and contractible die or templet, a coöperating blank supporting means, a means for moving the die or templet into and out of operative position, a positively acting means both for contracting and expanding the die or templet, and mechanical connections for automatically effecting the said operations and timed to automatically contract the templet before automatically moving it out of operative position.

28. In a machine for folding collars and the like, an axle, a support pivoted thereon, a cross-head carried in the free end of said support, a die mounted in said cross-head, a shifting device on said axle, an operating arm movably mounted in said cross-head and extending to the shifting device on said axle and actuated by said shifting device for operating said die, the sections of said die being capable of being shifted relatively to said support by said arm.

29. In a machine for infolding blanks for cuffs, collars and the like, the combination of a bed or support for the blanks to be infolded, a contracting and expanding templet having edge portions adapted to bear upon the blanks and coöperate in the folding operation by defining the form of the infold, infolders coöperating therewith and movable inwardly and outwardly to fold edge portions of the blank over edge portions of the said templet, and actuating mechanism for operating the said templet and the said infolders, and timed to expand the said templet before the complete inward movement of the infolders and positively contract the templet after such complete inward movement.

30. In a machine for infolding blanks for cuffs, collars and the like, the combination of a bed or support for the blanks to be infolded, a contracting and expanding templet having edge portions adapted to bear upon the blanks and coöperate in the folding operation by defining the form of the infold, infolders coöperating therewith and movable inwardly and outwardly to fold edge portions of the blank over edge portions of the said templet, actuating mechanism for operating the said templet and the said infolders, and timed to expand the said templet before the complete inward movement of the infolders and contract the templet after such complete inward movement, and coöperating means for pressing the infolders toward the said bed or support to press the infolds after their formation.

31. In a machine for infolding blanks for cuffs, collars and the like, the combination of a bed or support for the blanks to be infolded, a contracting and expanding templet having edge portions adapted to bear upon the blanks and coöperate in the folding operation by defining the form of the infold, infolders beneath which the infolds are formed, said infolders being mounted to be pressed down upon the infold, and co-acting mechanism for actuating the said templet and for pressing the said infolders, and timed to effect the pressing operations subsequently to the initial expansion of the templet and subsequently to the formation of the infolds.

32. In a machine for infolding blanks for cuffs, collars and the like, the combination of a bed or support for the blanks to be folded, a die or templet, infolding mechanism comprising infolders movable inwardly and outwardly to infold edge portions of the blanks, coöperating means for pressing the infolders toward the said bed or support to press the infolds after their formation, and actuating mechanism for operating the said infolders and pressing means, and timed to move the said infolders inwardly before the operation of the pressing means and to move the said infolders outwardly after the operation of the pressing means.

33. In a machine for infolding blanks for cuffs, collars and the like, the combination of a support or frame, an expansible and contractible templet carried by said frame, said templet being vertically immovable in said frame, positively acting automatic mechanism both for expanding and contracting said templet in said frame, automatic means coöperating with said support for moving said templet up and down, and power mechanism for actuating said automatic mechanism and said automatic means in harmony with each other, timed to effectuate the automatic and positive contraction of the templet in advance of the raising operation.

34. In a machine for infolding collars and the like, an expansible and contractible die or templet, a coöperating blank supporting means, a means for moving the die or templet into and out of operative position, a means for contracting and expanding the die or templet, and co-acting means for automatically so moving the said die or templet and expanding and contracting it, said means being timed to expand the said templet and subsequently while expanded move it into operative position.

35. In a machine for infolding blanks for cuffs, collars, and the like, the combination of a moving support or frame, an expansible and contractible templet carried by said frame, said templet being vertically immovable in said frame, automatic means coöperating with said support for moving said templet up and down, positively acting automatic mechanism, independent of said automatic means, for expanding and contracting the said templet laterally in said frame, and power mechanism for actuating said automatic mechanism and said automatic means in harmony with each other.

36. In a machine for infolding blanks for cuffs, collars, and the like, the combination of a moving support or frame, automatic means for moving the same up and down, a templet carried by said support or frame, said templet being vertically immovable in said frame, positively acting automatic mechanism actuated independently of said automatic moving means for moving said templet laterally in said frame, and means coöperating with said templet for receiving and maintaining a blank in place for infolding.

37. In a machine for folding collars and the like, folding knives or blades, a bed, a multi-part templet whose parts are relatively movable, a moving templet frame, automatic means for moving the same up and down, and positively acting automatic mechanism, independent of said moving frame and of said automatic means, for shifting the templet in said frame.

38. In a machine for folding collars and the like, folding knives or blades, a bed, a multi-part templet whose parts are relatively movable, a moving templet frame, automatic means for moving the same up and down, and automatic mechanism, independent of said moving frame and of said automatic means, for positively and automatically moving said templet parts in both directions relatively to each other.

39. In an infolding machine, the combination of an expansible and contractible die templet and a movable support for the same, means for adjusting the movable support to adjust the operative position of the die or templet, positively acting means both for expanding and contracting the die or templet including a loose connection, whereby said adjustment may be made, and said connection for expanding and contracting the die or templet maintained.

40. In an infolding machine of the type having an expansible die or templet and coöperating infolders, the combination of a means for expanding and contracting the die or templet, a means for actuating the infolders, and coöperative connections between the two, said connections being timed to contract the templet after the infolding movement and before the reverse motion of the infolders.

41. In an infolding machine of the type having an expansible die or templet and coöperating infolders, the combination of a means for expanding and contracting the die or templet, a means for actuating the infolders, and coöperative connections between the two, said connections being timed to contract the templet after the infolding movement and before the reverse motion of the infolders, and means for pressing down the infolders to crease the folds connected to act after the contraction of the templet and before the said reverse motion of the infolders.

42. In an infolding machine, the combination with the stationary parts, of a swinging die or templet carrying arm, an expansible die or templet, means for moving the arm, and power actuated means for expanding and contracting the die or templet, the last said means including connections which are maintained at all positions of the said arm.

43. In an infolding machine, the combination with the stationary parts, of a swinging die or templet carrying arm, an expansible die or templet, means for moving the arm, and power actuated means for expanding and contracting the die or templet, the last said means including connections which are maintained at all positions of the same arm, and coöperative connections for determining the sequence of movements of the arm and of the expansible die.

44. In a machine for infolding blanks or analogous articles, the combination of a support for the blanks to be folded, a templet constructed and fitted to be positioned upon and removed from the blanks upon said support, a plurality of infolders fitted to move inwardly and outwardly dissimultaneously, whereby they may fold the edges of a blank successively in order of time, means for removing said templet from a part of the folded edges, and mechanism for pressing the blank between the support and infolders after each of such successive folding operations upon said blank.

45. In a machine for folding blanks for collars and the like, the combination of a support for the blanks to be folded, a templet having a body portion and a fold-defining plate movable relatively to said body portion, a carrying arm extending from said body portion rearwardly to an axis about which said arm and templet swing, fittings whereby said templet and arm may be swung about said axis, a second arm adapted to swing with said templet and first arm, and having connections at its front end for operating said movable plate and extending at its rear end a substantial distance beyond the templet toward said axis of swinging, and connections near said axis of swinging and removed from the templet in the direction of said axis for actuating said rear end of said second arm.

46. In a machine for folding blanks for collars and the like, the combination of a support for the blanks to be folded, a templet having a body portion and fold - defining plates at least one of which is movable relatively to said body portion, a carrying arm extending from said body portion rearwardly to an axis about which said arm and templet swing, fittings whereby said templet and arm may be swung about said axis, a second arm adapted to swing with said templet and first arm, and having connections at its front end for operating said movable plate and extending at its rear end a substantial distance beyond the templet toward said axis of swinging, and connections near said axis of swinging and removed from the templet in the direction of said axis for automatically actuating said rear end of said second arm.

47. In a machine for folding blanks for collars and the like, the combination of a support for the blanks to be folded, a swinging templet having a body portion and a fold-defining plate movable relatively to said body portion, and two arms extending from the templet rearward toward its axis of swinging, one arm secured to the templet body and fitted at its rear end to receive swinging movement, and the second arm adapted to swing with said templet and first arm, said second arm having connections for operation of said movable plate and having other connections for effecting its own movements, said last named connections located at the rear end of said second arm whereby the same may remain connected and effect templet plate movements at different positions of the templet.

48. In a machine for folding blanks for collars and the like, the combination of a support for the blanks to be folded, a swinging templet having a body portion and a fold-defining plate movable relatively to said body portion, and two arms extending from the templet rearward toward its axis of swinging, one arm secured to the templet body and fitted at its rear end to receive swinging movement, and the second arm adapted to swing with said templet and first arm, said second arm having connections at its front end for operation of said movable plate and having other connections for causing relative to-and-fro movements as between said two arms whereby said second arm may operate said plate, said last named connections located at the rear end of said second arm whereby the same may remain connected and effect templet plate movements at different positions of the templet.

49. In a machine for folding blanks for collars and the like, the combination of a support for the blanks to be folded, a swinging templet having a body portion and a fold-defining plate movable relatively to said body portion, and two arms extending from the templet rearward toward its axis of swinging, one arm secured to the templet body and fitted at its rear end to receive swinging movement, and the second arm adapted to swing with said templet and first arm, said second arm having connections for operation of said movable plate and having an automatically acting device at its rear end for causing relative to-and-fro movements as between said two arms whereby said second arm may operate said plate, said device being such and so located that the operations of said plate may be effected at different positions of the templet.

50. In a machine for folding blanks for collars and the like, the combination of a support for the blanks to be folded, a swinging templet having a body portion and a fold-defining plate movable relatively to said body portion, and two arms extending from the templet rearward toward its axis of swinging, one arm rigid and the second movable relatively to the templet body, connections between said second arm and said plate, and connections near the axis of swinging whereby relative movement may be effected as between said arms, the operation of said last named connections being independent of the position of the templet.

51. In a machine for folding blanks for collars and the like, the combination of a support for the blanks to be folded, a swinging templet having a body portion and a fold-defining plate movable relatively to said body, and two arms extending from the templet rearward toward its axis of swinging, one arm rigid and the second movable relatively to the templet body, connections between said second arm and said plate, and connections near the axis of swinging whereby relative to-and-fro movement may be automatically effected as between said arms, said last named connections remaining connected irrespective of change of templet position.

52. In a machine for folding collars and the like, the combination of a support for the blanks to be folded, a sectional templet comprising sections, at least one of which is movable relative to another section, a pivotal member for swinging the same up and down about a given axis, pivots for permitting said member to swing about said axis, folding mechanism for infolding the edges of said blanks, and section-operating means comprising an arm adapted to swing with said templet and extending from the templet toward the axis of swinging, with connections between said arm and said section or sections, and a device for causing movement of the rear end of said arm, said device located near said axis of swinging, whereby it may retain its connection to said arm irrespective of change of templet position.

53. In a machine for folding collars and the like, the combination of a support for the blanks to be folded, a sectional templet comprising sections, at least one of which is movable relative to another section, a pivotal member for swinging the same up and down about a given axis, pivots for permitting said member to swing about said axis, folding mechanism for infolding the edges of said blanks, and section-operating means comprising an arm adapted to swing with said templet and extending from the templet toward the axis of swinging, with connections between said arm and said section or sections, and a device for causing to-and-fro movement of the rear end of said arm, said device located near said axis of swinging, whereby it may retain its connection to said arm irrespective of change of templet position.

54. In a machine for folding blanks for collars and the like, the combination of a support for the blanks to be folded, a templet, a templet carrying arm adapted to move toward and from said support, a second arm extending from the templet toward the bearings of the first arm and adapted to swing with said templet, a movable plate comprised in said templet, connections between one end of said second arm and said plate, whereby the arm may effect movements of said plate, and connections for actuating said second arm, said connections located at the rear end of said arm and near said bearings, whereby they may retain their connection irrespective of the templet's swinging.

55. In a machine for folding blanks for collars and the like, the combination of a support for the blanks to be folded, a swinging templet having a body portion and a fold-defining plate movable relatively to said body portion, infolding mechanism for infolding edges of blanks over edges of said plate, and a single part which, when actuated, effects in a predetermined manner both the swinging of said templet and the movements of said plate, namely, the down-swinging of the templet and the out-moving of its plate so as to bring the expanded templet upon to define the infolded blanks, and after the folds are formed the reverse of these movements.

Signed at the village of Lansingburg, this 4th day of May 1897 and in the presence of the two witnesses whose names are hereto written.

GARRY J. DORMANDY.

Witnesses:
E. O. HOUSE,
W. E. HAGAN.